Patented June 15, 1937

2,084,261

UNITED STATES PATENT OFFICE 2,084,261

RESINOUS AND WAX-LIKE REACTION PRODUCTS FROM POLYHYDRIC ALCOHOLS AND BORIC ACID COMPOUNDS

Willis A. Boughton, Cambridge, and William R. Mansfield, Boston, Mass., assignors to New England Mica Co., Waltham, Mass., a corporation of Massachusetts No Drawing. Application September 28, 1934, Serial No. 746,016

2 Claims. (Cl. 260—98)

This invention relates to new organic-boric acid compounds, and specifically to resin-like and wax-like compounds made from polyhydric alcohols and certain boric acid compounds.

An object of this invention is the production of resin-like materials by the reaction of polyhydric alcohols with boric acid compounds under certain temperature conditions.

A further object is the production of such materials which shall be capable of forming waxes and hard resins.

A further object is the production of adhesives useful in the bonding of discrete particles of matter, such as in the manufacture of laminated mica products.

As heretofore disclosed in the following applications for patents—

Boughton, Serial No. 521,378, filed March 9, 1931, Patent No. 1,975,078; Boughton, Serial No. 546,153, filed June 22, 1931, Patent No. 1,975,079; Boughton, Serial No. 546,154, filed June 22, 1931, Patent No. 2,016,274; Boughton and Mansfield, Serial No. 599,844, filed March 18, 1932, Patent No. 1,975,080; Boughton, Serial No. 719,233, filed April 5, 1934, Patent No. 2,004,030; salts of mono- (or meta-) boric acid are of great value in the compounding of inorganic adhesives, particularly in the manufacture of laminated mica products, because of the colloidal, viscous, nature of their aqueous solutions and the glass-like condition of their fused forms.

It has now been found that by fully reacting various boric acid compounds with a polyhydric alcohol such as glycerol, and ethylene glycol, resinous products are formed which not only incorporate the properties of the wholly inorganic boric acid compounds in solution, but at higher temperatures continue to be adhesive and have novel and valuable thermal and electrical properties throughout a wide range of temperatures. Such products are wax-like or hard semi-glass-like resinous masses. Because of the unusual mechanical and chemical difficulty of analyzing such materials, no proof of their exact chemical nature can be offered at this time, but they are believed to be the ester-like derivatives of the boric acid compounds, produced by successive dehydration of the ortho- and pyro- forms according, in one variety, to the following diagram.

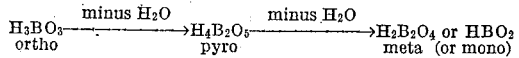

It is believed that all of the boric acid compounds reacted with glycerin as described below enter into this scheme in one stage or another to form, finally, the monoboric acid compound. In other words, when the reaction takes place at all, the eventual product is the monoboric acid compound.

The orthoboric acid compounds show practically none of the resinous adhesive properties sought. The pyroboric acid compounds are thinly viscous or somewhat waxy. The monoboric acid compounds on the other hand show resinous or waxy properties to a high degree.

The characteristics of the reaction products and the conditions of the reaction employed dependent on (1) the particular inorganic compound used, (2) the polyhydric alcohol used, (3) the proportions employed, and (4) the temperature.

In general, the reaction takes place in three recognizable stages, as follows: (1) At temperatures below 100° C. the boric acid compound dissolves in the polyhydric alcohol to its maximum solubility, probably to form the orthoborate. (2) From 100° to 140° C. water of composition and reaction is evolved and the excess of boric acid compound dissolves in part to form wax-like products; or if no excess is present, the mass becomes increasingly viscous. Such compounds are probably pyroborates. From 140° to 180° or 200° C. viscosity increases, and complete solution takes place with evolution of considerable water. The products are usually hard resins and are probably the monoborates. They are soluble in both water and alcohol, and are somewhat hygroscopic in moist air. Their bonding properties are excellent. At ordinary temperatures the bond is hard to flexible. After having been heated to 180–315° C., a harder stiff bond is formed. Above about 300–350° C. the organic part of the molecule is charred. Fusion of the inorganic residue to form a glassy adhesive bond takes place below 650° C. During the entire range of temperature such materials have the property of bonding laminated mica products, and other temperature-resisting materials.

In addition to the products obtained from single polyhydric alcohols, useful products of this type are also obtained with mixtures of polyhydric alcohols, for example, mixtures of glycerol and ethylene glycol, in any proportion, with single or mixed boric acid compounds, may be used in any of the examples described herein.

Details of the preparations and properties of various products now follow—

TABLE 1

*Products of reaction between 100 g. of glycerol and various amounts of orthoboric acid*

| Boric acid, grams | At 100° C. | At 120° C. | At 160–180° C. |
|---|---|---|---|
| 25 | Clear water white viscous liq. | Unchanged | Unchanged. |
| 50 | Opaque viscous liq. | Clear water white viscous liq. | Clear yellowish plastic. |
| 75 | Opaque waxy fluid. | Opaque waxy semi-fluid. | Clear highly viscous yellowish. |
| 100 | | White waxy plastic. | Clear yellowish hard resin. |
| 150 | | do | Do. |
| 200 | | Hard white wax-like body. | Opaque hard resin. |
| 250 | | do | Do. |

Obviously the optimum proportions for the hard, bonding resin sought are 75–150 grams of boric acid to 100 grams of glycerol, and the temperature specification is 160–180°.

TABLE 2

*Summary of optimum conditions for reaction of boric acid compound with 100 g. of glycerol*

| Boric acid compound | Grams | Temperature centigrade | Description of product |
|---|---|---|---|
| Boric acid | 100–150 | 160–180 °C. | Clear to slightly opaque hard resins. |
| Borax | 100 | 130–160 | Do. |
| Boric anyhdride | 100 | 160–180 | Slightly opaque yellow-brown, hard resins. |
| Ammonium borate | 100 | 180–200 | Slightly to heavily opaque hard resins. |
| Magnesium borate | 100 | 180–200 | Greenish yellow, clear to creamy, hard resins. |
| Manganese borate | 100 | 160–180 | Brown, hard resins. |
| Potassium borate | 100 | 140 | Clear to cloudy, white resins. |
| | 100 | 180 | Clear, yellowish, hard resins. |
| Sodium monoborate | 100 | 140–160 | Clear, yellowish soft to firm resins. |
| | 100 | 160 | Opaque, hard resin. |
| Sodium perborate | 100 | 140 | Clear, dark brown, hard resin. |
| *Using 100 g. of ethylene glycol instead of glycerol* | | | |
| Boric acid | 200 | 160–200 | Cloudy hard resins. |
| Borax | 100 | 200 | Clear hard resins. |

Experiments with heavy metal borates failed to show formation of analogous resinous compounds.

These resin-like compounds, either alone or in combination with other adhesives, form highly efficient bonding agents for a great variety of materials, including mica flakes, sheets or layers of various materials, mineral and vegetable fibrous matter, and many kinds of powdered materials.

We claim—

1. The mono-boric reaction products obtained by reacting mixed polyhydric alcohols with at least one boric acid compound capable of reacting and combining therewith, at temperatures between about 100° C. and about 140° C., said reaction products containing mono-boric compounds and being colloidal and wax-like viscous liquids to waxy plastics.

2. The mono-boric reaction products obtained by reacting mixed glycerol and ethylene glycol and at least one boric acid compound capable of reacting and combining therewith, at temperatures between about 100° C. and about 140° C., said reaction products containing mono-boric compounds and being colloidal and wax-like viscous liquids to waxy plastics.

WILLIS A. BOUGHTON.
WILLIAM R. MANSFIELD.